Figure 1:
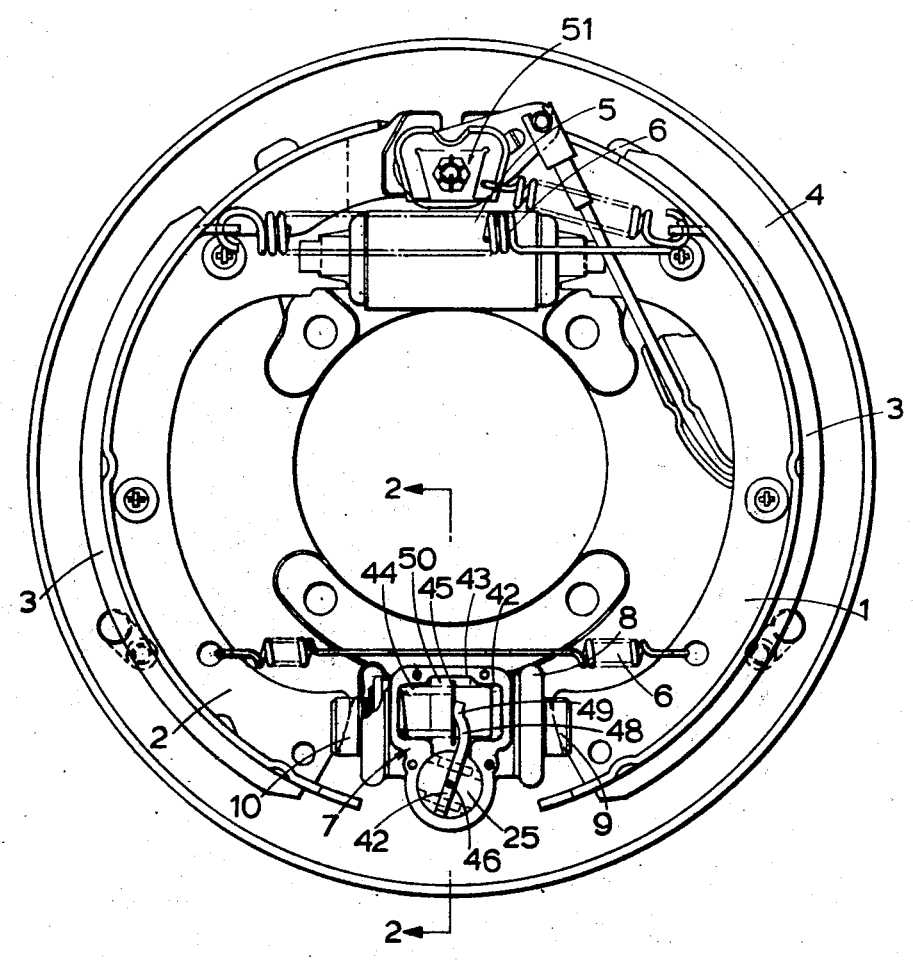

United States Patent [19]

Newstead et al.

[11] 4,056,175

[45] Nov. 1, 1977

[54] SLACK ADJUSTERS FOR THE SHOES OF VEHICLE SHOE DRUM BRAKES OF THE DUO SERVO TYPE

[75] Inventors: Charles Newstead, Walsall; Andrew Charles Assinder, Redditch; Geoffrey Harvey, Birmingham, all of England

[73] Assignee: Girling Limited, Birmingham, England

[21] Appl. No.: 723,657

[22] Filed: Sept. 15, 1976

[30] Foreign Application Priority Data

Sept. 30, 1975 United Kingdom ............... 39903/75

[51] Int. Cl.[2] .............................................. F16D 65/56
[52] U.S. Cl. ......................... 188/196 BA; 188/79.5 P
[58] Field of Search ....................... 188/79.5 P, 79.5 S, 188/79.5 SC, 196 BA, 196 C, 196 D, 196 F

[56] References Cited

U.S. PATENT DOCUMENTS

| 2,255,260 | 9/1941 | Loweke | 188/79.5 P |
| 3,805,926 | 4/1974 | Clay et al. | 188/79.5 P |
| 3,838,757 | 10/1974 | Farr | 188/79.5 P |

FOREIGN PATENT DOCUMENTS

| 1,440,356 | 4/1966 | France | 188/196 BA |
| 1,504,837 | 10/1967 | France | 188/196 F |
| 1,024,457 | 3/1966 | United Kingdom | 188/196 BA |

Primary Examiner—Stephen G. Kunin
Assistant Examiner—Edward R. Kazenske
Attorney, Agent, or Firm—Scrivener, Parker, Scrivener & Clarke

[57] ABSTRACT

An automatic slack adjuster assembly is provided in or for a vehicle internal shoe drum brake of the duo-servo type having primary and secondary shoes located within a rotatable drum so that the primary shoe is carried round with the drum when the brake is applied, the slack adjuster assembly being located in a housing between adjacent ends of the shoes and including a thrust member which engages the ends of the shoes and transmits thrust on the primary shoe to the secondary shoe when the brake is applied. The adjuster assembly includes a sensing mechanism which senses relative movement between the thrust member and the housing and controls an energy-storing clutch mechanism which is connected to an adjuster and operates the adjuster to increase the effective length of the thrust member when the torque generated by the stored energy force is greater than the torque generated by the force applied to the thrust member from the shoe ends.

9 Claims, 2 Drawing Figures

SLACK ADJUSTERS FOR THE SHOES OF VEHICLE SHOE DRUM BRAKES OF THE DUO SERVO TYPE

SPECIFIC DESCRIPTION

This invention relates to automatic slack adjusters for the shoes of vehicle internal shoe-drum brakes of the duo-servo type, the adjusters being of the kind comprising a housing, a thrust member slidably guided in the housing and of which the effective length is adjustable, opposite ends of the thrust member adapted for engagement by ends of the shoes so that the thrust of one shoe, known as the primary shoe which is carried round with the drum with a self-energising or servo-action when the brake is applied, is transmitted to the other shoe, known as the secondary shoe, to augment the brake applying force applied to the secondary shoe, sensing means for sensing movement of the shoes when the brake is applied, and adjuster means incorporated in the housing for automatically increasing the effective length of the thrust member to compensate for wear of friction linings carried by the shoes when the said movement exceeds a predetermined amount.

In known slack adjusters of the kind set forth for the shoes of internal shoe-drum brakes of the duo-servo type, the sensing means are separate from the housing and are adapted to sense relative movement between the shoes, or between parts of an actuator for separating the shoes at their opposite actuated ends, and the relative movement sensed by the sensing means is transmitted to the adjuster means through transmission means, conveniently an inextensible cable assembly.

According to our invention in an automatic slack adjuster of the kind set forth the sensing means is located in the housing and is adapted to sense relative movement of the thrust assembly with respect to the housing in the application of the brake, and energy-storing clutch means controlled by the sensing means is also located within the housing and is connected to the adjuster means to operate the adjuster means to increase the effective length of the thrust-assembly when the torque generated on the thrust assembly by the stored energy force exceeds the torque generated by the force applied to the thrust assembly from the shoe ends.

Preferably the sensing means comprises a part of said adjuster means so coupled to the thrust member that said part moves in response to sliding movement of the thrust member, at least beyond a given amount, during application of the brake, and so that actuation of said part by the energy-storing clutch means effects adjustment of the length of the thrust assembly, the energy-storing clutch means comprising energy-storing means connected through a one-way clutch to said part, and lost motion being incorporated in the connection from the clutch through said part to the thrust member.

The arrangement is preferably such that, when adjustment of the shoes is required, application of the brake during forward rotation of the brake drum causes the thrust member and said part to move in one direction, the clutch being overridden when said lost motion has been taken up, and such that on reduction of the braking force the thrust member and said part are moved in the opposite direction under the force of the brake shoe return springs, and said clutch is engaged to store energy which is subsequently released on substantial release of the brakes to actuate said part to effect adjustment of the length of the thrust member.

The thrust member conveniently comprises a body provided with helical gear teeth and having threaded engagements of opposite hands at its opposite ends with two tappets for engagement with the respective shoes, the gear teeth meshing with a helically-toothed pinion constituting said part.

Preferably the ratio of the pitch of the threaded engagements with the tappets to that of the helical gear teeth is chosen such that adjustment of the brake shoe clearances is not achieved during a single application and release of the brakes but gradually during a number of successive applications.

The pinion is preferably keyed to the clutch an permitted a limited amount of displacement in the housing along its axis, said lost motion being comprised by this permitted axial displacement together with some play between the meshing gear teeth.

Manual adjustment means may be provided for adjusting the permitted amount of axial displacement of the pinion to control the magnitude of the adjusted clearance between the brake shoes and the brake drum.

Further manual adjustment means may be provided comprising resiliently biassed means to disengage the key between the pinion and the clutch and to engage with the pinion to enable the pinion to be turned manually to adjust the brake clearances, on the fitting of new shoes for example.

Figure 2:
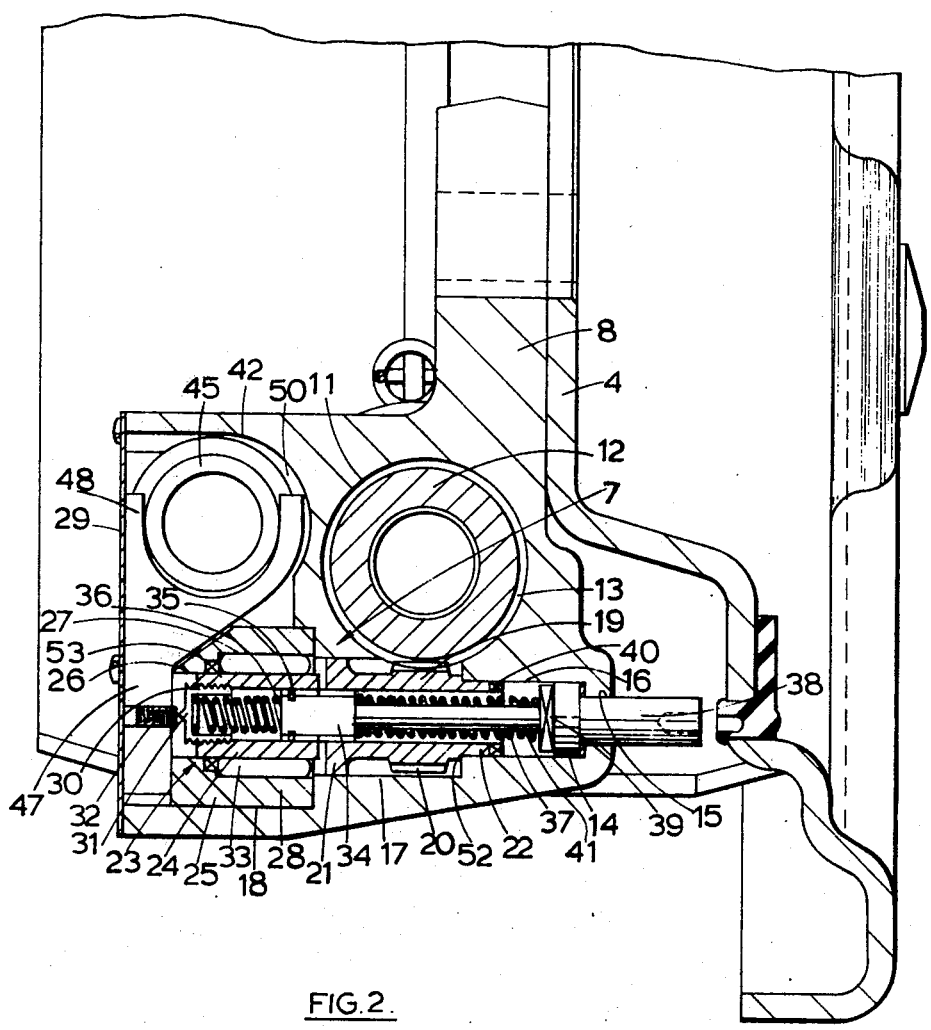

An automatic slack adjuster assembly in accordance with the invention will now be described, by way of example only, with reference to the accompanying drawings in which:

FIG. 1 is a side elevation of an internal shoe drum brake assembly of the duo-servo type incorporating the adjuster assembly according to the invention with a cover plate removed from the housing to show the energy-storing spring with the spring in its extended condition; and FIG. 2 is a section through the adjuster assembly taken on the line 2—2 in FIG. 1.

In the brake illustrated in FIGS. 1 and 2, two arcuate shoes 1, 2 carrying friction linings 3 for engagement with a rotatable drum (not shown) are mounted on a stationary back plate 4. Actuating means 5 is adapted to apply the brake by separating a first pair of adjacent ends of the shoes 1, 2, moving them radially outwardly into contact with an inwardly facing surface of the drum. The shoes 1, 2 are biassed towards each other by return springs 6.

An automatic adjuster assembly 7 is provided between the second pair of adjacent ends of the shoes 1, 2 so as to automatically adjust the position of the brake shoes relative to the brake drum and to compensate for wear of the friction linings 3. The adjuster comprises a housing 8 secured to the back plate 4. Two tappets 9, 10 slidable in the housing protrude from opposite ends thereof, as shown in FIG. 1 and act on adjacent ends of the brake shoes 1, 2.

The housing 8 has a first through bore 11, as shown in FIG. 2, in which is slidable a thrust member comprising a body portion in the form of a sleeve 12 provided over a central portion of its length with external helical gear teeth 13 and having threaded engagements at its opposite ends with the tappets 9, 10. The threaded engagements are of opposite hands so that rotation of sleeve 12 in the housing causes the tappets 9, 10 to be urged apart or together depending on the direction of rotation of the sleeve.

A stepped through-bore 14 extends in the housing transversely to bore 11 and has four bore portions 15, 16, 17 and 18 of progressively increasing diameter. In bore portion 17 is housed a pinion 19 having helical gear teeth 20 meshed with the gear teeth 13 of sleeve 12. Bearings for the pinion are provided by a radial flange 21 at one of its ends which is journalled in bore portion 17 and by a spigot 22 at its other end which is journalled in bore portion 16.

A sprag clutch 23 is housed in bore portion 18 and comprises inner and outer clutch members 24 and 25, the inner clutch member 24 comprising a sleeve of which the outer end is journalled in a bore portion 26 of a stepped bore 27 extending through the outer clutch member 25. The outer clutch member 25 has its longer inner end 28 journalled in bore-portion 18 and held against a step in bore 14 between bore-portions 17 and 18 by a generally triangular shaped cover-plate 29 closing one side of the housing. The inner clutch member 24 is prevented from moving outwards by a cup-shaped bearing member 30 threadably secured to it and having a bearing point 31 which bears on the inner end of an adjuster screw 32.

The inner and outer clutch members 24, 25 are connected together for relative rotation in one direction by balls or rollers 33. The inner clutch member 24 is keyed to the pinion 19 by a splined dog 34 engaging with internal splines in the adjacent ends of clutch member 24 and pinion 19.

The splined dog 34 has a circlip 35 located in an annular groove in its splined surface and is biassed to the position shown in FIG. 2 by a compression spring 36 bearing against cup member 30 with the circlip abutting the inner ends of internal splines provided on clutch member 24. The dog 34 with its circlip, and the spring 36 are assembled into the clutch member 24 through the end of member 24 which is subsequently closed by cup member 30. The components 24, 30, 34, 36 and 35 constitute a sub-assembly.

A spring 37 of lower fitted strength than spring 36 acts between dog 34 and a plunger 38 to biass the plunger to the position shown in FIG. 2 in which teeth 39 are out of engagement with complementary teeth 40 formed on the adjacent end of the spigot 22 of pinion 19.

Plunger 38 is formed at its inner end with an axial spigot 41 the inner end of which is normally spaced from dog 34. On manual depression of plunger 38 into the housing spigot 41 engages dog 34 as shown in FIG. 2, and subsequently pushes it farther into the bore of the inner clutch member 24 so that the pinion 19 moves away from the inner clutch member 24, and the teeth 39 and 40 then co-operate to enable pinion 19 to be rotated by rotation of the plunger. This causes rotation of sleeve 12 of the thrust member through the engagement of gear teeth 20 on the pinion 19 with gear teeth 13 on the sleeve 12 and effects manual adjustment of the length of the thrust member.

A further bore 42 extends in the housing 1 parallel to bore 11 and open to the side of the housing closed by cover plate 29. A top-hat member 43, shown in FIG. 1, is slidable in the bore 42 and a spring 44 acts between one end of the bore and a flange 45 of the top hat member.

The outer clutch member 25 is provided at its outer end with a diametral slot 46 in which is clamped a fork 47 having two prongs 48. The prongs are provided with recurved ends 49 which bear on the flange 45 of the top hat member. The central portion of the bore 42 is enlarged at 50 to define a chamber sufficiently large to accommodate the prongs 48 and flange 45 for the full range of movement of the fork. Spring 44 comprises an energy-storing means, a counter-clockwise displacement of outer clutch member 25 in FIG. 1 resulting in displacement of top-hat member 43 to the left to compress spring 44 and store energy therein.

When the brake is applied with the brake drum rotating in a forward direction the leading shoe, which is known as the primary shoe, is carried round by the brake drum. The thrust on the primary shoe is transmitted to the other, or secondary shoe, by the sleeve 12 of the thrust member to provide a servo- or self-energising effect. The drag on the shoes then is taken by an anchor pin 51 with which the free end of the secondary shoe remote from the primary shoe engages.

The operation of the adjuster assembly will now be described. The sprag clutch 23 is arranged such that rotation of inner clutch member 24 in a clockwise direction relative to outer clutch member 25, as viewed in FIG. 1, is permitted but relative rotation in the opposite direction is not permitted. There is some play in the engagements between the helical gear teeth 20 of the pinion 19 and the teeth 13 of sleeve 12, and furthermore pinion 19 is permitted a limited amount of axial movement in bore 14 as determined by engagement of flange 21 of the pinion with inner clutch member 24, and the spacing between a shoulder 52 on the pinion and the step in bore 14 between bore portions 16 and 17. The amount of axial play is determined by the setting of adjuster screw 32 which controls the axial position of the inner clutch member 24.

On application of the brakes with the brake drum rotating in a forward direction the sleeve 12 of the thrust member is moved towards the reader in FIG. 2. Initial sliding movement of sleeve 12 will be accommodated by the clearances between teeth of the meshing helical gears 13 and 20. Further sliding movement will cause pinion 19 to move axially towards clutch inner member 24 until its axial play is taken up, pinion 19 being restrained against rotation by an O-ring 53 bearing on the outer surface of inner clutch member 24 and received in an internal annular groove in the bore of outer clutch member 25. If the brake clearances are correct sleeve 12 will move no further so that pinion 19 will not have been rotated during application of the brakes.

If, however, the brake clearances are in need of adjustment then sleeve 12 will be further displaced sufficiently to turn pinion 19 and inner clutch member 24 clockwise by a small amount with the clutch freewheeling. On release of the brakes the thrust member is returned to its central position in bore 11 by the action of the brake-shoe return springs 6. Thus sleeve 12 of the thrust member moves away from the reader in FIG. 2. Initial reverse sliding movement of sleeve 12 is accommodated by the clearances between the helical gear teeth 13 and 20, and subsequent movement by axial displacement of the pinion 19 to the right in FIG. 2 until the axial play of pinion 19 is taken up whereupon further sliding movement of sleeve 12 in the same direction causes pinion 19, inner clutch member 24 and outer clutch member 25, through positive engagement of the clutch, to be displaced anticlockwise as viewed in FIG. 1. Displacement of outer clutch member 25 anti-clockwise causes the fork prongs 48 to displace top-hat member 43 to the left in FIG. 1 progressively to compress spring 44 and store energy in the spring.

Should the load on the shoe ends produce an axial load on the threads forming the engagement between the tappets 9, 10 and sleeve 12 of a magnitude greater than the torque applied to the pinion 19 by spring 44, further movement of the sleeve 12 in the same direction causes pinion 19 to be rotated without any rotation of sleeve 12 so that spring 44 becomes more compressed. On substantial release of the brakes the force exerted by the shoe ends on the threads of the tappets 9, 10 is sufficiently reduced to enable spring 44 to rotate the pinion 19 clockwise and to turn sleeve 12 to screw out the tappets 9, 10 thereby to reduce the clearances between the brake shoes 1, 2 and the brake drum. The ratio of the pitch of the threaded engagements between the tappets 9, 10 and the sleeve 12 to the pitch of the helical gear teeth 20 is chosen such that the alteration in brake clearances that is brought about by one application and release of the brakes is not normally sufficient to bring the clearances to the correct value. Several successive applications and release of the brakes will normally be required.

If during light reverse braking, in which the sleeve is moved axially in the reverse direction from its central position, the load on the shoe ends does not generate sufficient torque on the tappet threads to resist rotation of the sleeve 12 by the spring 44 then the sleeve 12 will be rotated substantially during the reverse sliding movement of the sleeve and before release of the brakes.

It will be appreciated that, since the position of adjuster screw 32 determines the amount of lost motion in the connection between clutch inner member 24 and the sleeve 12 through pinion 19 which corresponds to a permitted amount of sliding movement of sleeve 12 during which the clutch is inoperative, the position of screw 32 determines the magnitude of the brake clearances achieved by the adjuster assembly. Screw 32 may be preset prior to incorporation of the adjuster assembly in a brake.

We claim:

1. A vehicle internal shoe drum brake comprising a rotatable drum, primary and secondary shoes located within said drum, said primary shoe being carried around with said drum with a servo-action when the brake is applied, and automatic slack adjustment means being located between adjacent ends of said shoes, wherein said automatic slack adjusting means comprises a housing, a thrust member slidably guided in said housing and having an adjustable effective length, two tappets slidable in said housing and protruding from opposite ends thereof for engagement by ends of said shoes so that the thrust on said primary shoe when the brake is applied is transmitted to said secondary shoe to augment the brake applying force applied to said secondary shoe, said thrust member having threaded engagements of opposite hands at its opposite ends with said tappets, sensing means for sensing movement of said shoes when the brake is applied, and adjuster means incorporated in said housing for automatically increasing the effective length of said thrust member to compensate for wear of friction linings carried by said shoes when the said movement exceeds a predetermined amount, said sensing means comprising a helically toothed pinion forming a part of said adjuster means, said thrust member comprising a body provided with helical gear teeth meshing with said teeth on said toothed pinion such that said pinion moves in response to sliding movement of said thrust member, at least beyond a given amount, during application of the brake, and energy-storing clutch means controlled by said sensing means located within said housing and connected to said adjuster means to operate said adjuster means to increase the effective length of said thrust member when the torque generated on said thrust member by stored energy force exceeds the torque generated by the force applied to said thrust member from said shoe ends, said energy-storing clutch means acting on said pinion so as to effect adjustment of the length of said thrust member, said energy-storing clutch means comprising energy-storing means, a one-way clutch connected to said energy-storing means, said one-way clutch being connected to said pinion, and lost motion being incorporated in the connection from said clutch through said pinion to said thrust member.

2. An automatic slack adjuster as claimed in claim 1, wherein the ratio of the pitch of said threaded engagements with said tappets to that of said helical gear teeth comprises means for arranging that adjustment of the brake shoe clearance is achieved gradually during a number of successive applications of the brake.

3. An automatic slack adjuster as claimed in claim 1, wherein key means key said pinion to said clutch, said pinion being permitted a limited amount of displacement in said housing along its axis, said lost motion being comprised by this permitted axial displacement together with some play between said meshing gear teeth.

4. An automatic slack adjuster as claimed in claim 3, wherein said key means comprises a splined dog engaging with internal splines in the adjacent ends of said clutch and pinion so as to key said pinion to said clutch.

5. An automatic slack adjuster as claimed in claim 3, wherein manual adjustment means are provided for adjusting the permitted amount of axial displacement of said pinion to control the magnitude of the adjusted clearance between said brake shoes and said brake drum.

6. An automatic slack adjuster as claimed in claim 3, wherein manual adjustment means are provided, comprising resiliently biassed means to disengage said key means between said pinion and said clutch and to engage with said pinion to enable said pinion to be turned manually to adjust the brake clearances.

7. An automatic slack adjuster as claimed in claim 1, wherein said clutch comprises inner and outer clutch members, roller means connecting together said clutch members so as to allow relative rotation in one direction, said inner clutch member comprising a sleeve having inner and outer ends, the outer clutch member having an internal bore, the outer end of said sleeve being journalled in said internal bore, the inner end of said inner clutch member being keyed to said pinion.

8. An automatic slack adjuster as claimed in claim 1, wherein said housing has a first through bore, a second through bore extending transversely to and intersecting a side portion of said first bore, and a third bore parallel to and spaced from said first bore, said third bore being open to one side of said housing and one end of said second bore being open to the same side of said housing, said thrust member being housed in said first throughbore, said clutch and pinion being housed in said second bore, said gear teeth in said thrust member engaging with said teeth in said pinion at the intersection point of said first and second bores, and said energy storing means being housed in said third bore.

9. An automatic slack adjuster as claimed in claim 8, wherein said clutch is located in an end portion of said second bore adjacent to said side of said housing, an outer end of said clutch having a slot, a fork member being clamped in said slot, said fork member extending into said third bore, said energy storing means including an abutment member slidable in said third bore and an energy storing spring housed at one end in said abutment member, said fork member bearing on said abutment member.

* * * * *